April 3, 1945. R. F. KERSTETTER 2,372,724
LOG GRAB HOOK
Filed July 25, 1944
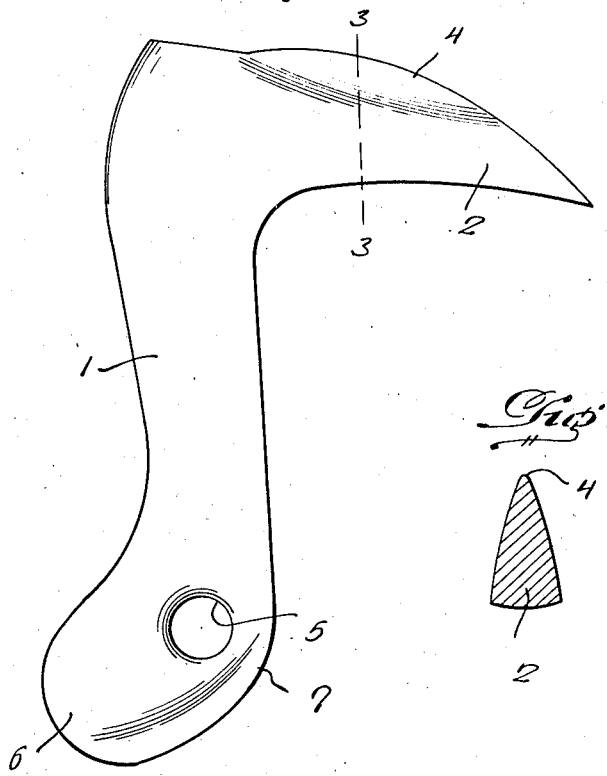
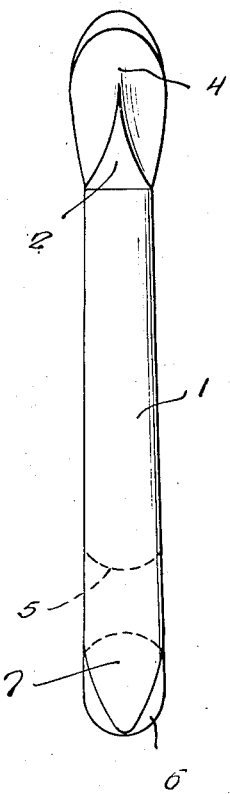
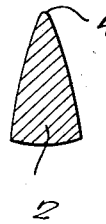
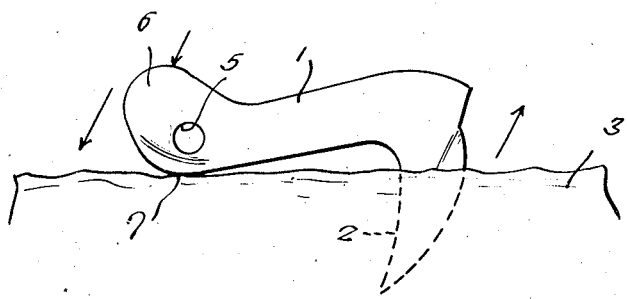
Inventor
Russel F. Kerstetter Patented Apr. 3, 1945

2,372,724

UNITED STATES PATENT OFFICE 2,372,724

LOG GRABHOOK

Russel F. Kerstetter, Mechanicsburg, Pa.

Application July 25, 1944, Serial No. 546,496

3 Claims. (Cl. 294—82)

The present invention relates to new and useful improvements in log grab hooks and has for its primary object to provide, in a manner as hereinafter set forth, a hook of this character comprising unique means whereby said hook may be expeditiously extracted by simply striking same with a sledge or other suitable tool.

Other objects of the invention are to provide a log grab hook of the aforementioned character which will be comparatively simple in construction, strong, durable, highly efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of a log grab hook constructed in accordance with the present invention.

Figure 2 is a view in front elevation of the device.

Figure 3 is a view in transverse section through the bill of the hook, taken substantially on the line 3—3 of Figure 1.

Figure 4 is a side elevational view, showing the hook engaged in a log.

Referring now to the drawing in detail, it will be seen that the embodiment of the invention which has been illustrated comprises a shank 1 of suitable steel, which shank may be of any desired dimensions.

Formed integrally with the forward end portion of the shank 1 is a bill 2 which, as illustrated to advantage in Figure 4 of the drawing, is adapted to be driven downwardly in the usual manner in a log or other object, as at 3. The bill 2 has an intermediate portion of substantially triangular cross section which is formed to provide an arcuate front edge portion 4.

The rear end portion of the shank 1 has formed therein an eye 5 for connecting the hook to the usual chain. Formed intgerally with the rear end of the shank 1 is an upwardly curved lug or projection 6. At the point where it joins the rear end of the shank 1, the lug 6 forms a fulcrum 7 substantially below the eye 5.

It is thought that the manner in which the hook is used will be readily apparent from a consideration of the foregoing. Briefly, the bill 2 of the hook is driven into the log or other object 3 in the usual manner. As hereinbefore indicated, the usual chain is connected to the hook through the eye 5. Now, to extract the bill 2 from the log 3 or other object, the lug 6 is struck a downwardly and rearwardly directed blow with a sledge or other suitable tool, as indicated by the arrows in Figure 4 of the drawing. In this manner the hook is caused to rock on the fulcrum 7 and the bill 2 is swung upwardly out of the log or other object. Of course, the fulcrum 7 rests on the log 3 or other object.

It is believed that the many advantages of a log grab hook constructed in accordance with the present invention will be readily understood, and although a preferred embodiment of the device is as illustrated and described, it is to be understood that changes in the details of construction may be resorted to which will fall within the scope of the invention as claimed.

What is claimed is:

1. A log grab hook comprising a shank having an eye in its rear end portion, a bill projecting in one direction from the forward end portion of the shank, and a lug projecting in substantially the opposite direction from the rear end portion of said shank.

2. A log grab hook comprising a shank, a bill on one end portion of the shank engageable in an object, and a lug on the other end of the shank and projecting in a direction substantially away from an object in which the bill is engaged.

3. A log grab hook comprising a shank having an eye in one end portion, a bill projecting angularly from the other end portion of the shank, a lug on said one end portion of the shank and projecting therefrom in a direction substantially away from an object in which the bill may be engaged, and a fulcrum on said one end portion of the shank adjacent the eye.

RUSSEL F. KERSTETTER.